United States Patent [19]

Hiraiwa et al.

[11] Patent Number: 4,613,008

[45] Date of Patent: Sep. 23, 1986

[54] 2WD-4WD CHANGE-OVER CONTROL SYSTEM RESPONSIVE TO RAINFALL AND ACCELERATION

[75] Inventors: Kazuyoshi Hiraiwa, Atsugi; Akihiko Muraoka, Yokohama, both of Japan

[73] Assignee: Nissan Motor Co., Ltd., Yokohama, Japan

[21] Appl. No.: 807,314

[22] Filed: Dec. 10, 1985

[30] Foreign Application Priority Data

Dec. 12, 1984 [JP] Japan .................................. 59-262219

[51] Int. Cl.⁴ .......................... B60K 17/34; B62D 1/24
[52] U.S. Cl. .................................... 180/247; 180/167; 180/169; 73/171; 340/59
[58] Field of Search ............... 180/247, 167, 168, 169, 180/197, 233, 131, 141, 79.1; 73/171, 73; 340/59, 602, 669

[56] References Cited

U.S. PATENT DOCUMENTS

| | | | |
|---|---|---|---|
| 4,417,641 | 11/1983 | Kageyama | 180/247 |
| 4,444,073 | 4/1984 | Moroto et al. | 180/247 |
| 4,504,823 | 3/1985 | Berthel | 73/171 |
| 4,520,667 | 6/1985 | Nelson | 73/171 |
| 4,558,414 | 12/1985 | Sakakiyama | 180/197 |

Primary Examiner—John J. Love
Assistant Examiner—Donn McGiehan
Attorney, Agent, or Firm—Schwartz, Jeffery, Schwaab, Mack, Blumenthal & Evans

[57] ABSTRACT

A control system for automatically selecting a two wheel drive mode or a four wheel drive mode has a rainfall sensor for measuring the amount of precipitation such as rain, an acceleration sensor for measuring acceleration or deceleration of the vehicle, a control unit connected with the sensors for generating a 2WD or 4WD command signal, and an actuator for changing the drive system of the vehicle between the two wheel drive mode and four wheel drive mode in response to the command signal of the control unit. The control unit such as a microcomputer determines a reference acceleration and a reference deceleration each of which is a function of the rainfall measured by the rainfall sensor, and generates the 2WD command signal if the actual acceleration or deceleration is smaller than the reference acceleration or deceleration, and the 4WD command signal if the actual acceleration or deceleration is greater than the reference acceleration or deceleration.

6 Claims, 5 Drawing Figures

4,613,008

2WD-4WD CHANGE-OVER CONTROL SYSTEM RESPONSIVE TO RAINFALL AND ACCELERATION

BACKGROUND OF THE INVENTION

The present invention relates to a control system for selecting a two wheel drive mode or a four wheel drive mode in a so-called part-time four wheel drive vehicle.

A conventional system of this kind is disclosed in "Motor Fan" (Japanese magazine), October 1984, page 101. In this system, a 2WD-4WD change-over unit is connected with a brake switch for turning on stop lamps when the brake is applied. The change-over unit is normally put in the two wheel drive state, and shifted to the four wheel drive state to prevent rear wheel lock and ensure vehicle stability when the brake is applied and the brake switch is turned on.

However, this system changes the drive system to the four wheel drive mode even when the brake pedal is depressed so slightly that the four wheel drive mode is not required. Therefore, this system causes uncomfortable feeling and deteriorates the durability of the 2WD-4WD change-over mechanism uselessly.

In general, a force acting in a tire to road contact surface is a vector sum of a driving force or braking force acting in a direction of wheel travel, and a side force acting laterally of the tire. The magnitude of a frictional force between a tire and a road surface is equal to a product of a weight of the vehicle body acting vertically on the wheel and a coefficient of friction between the tire and road surface. The above-mentioned vector sum cannot exceeds the magnitude of the frictional force. Therefore, when the driving or braking force is increased during rapid acceleration or hard braking, an upper limit of the side force is decreased, and the critical value of a cornering force related to the side force is decreased. As a result, the controllability and stability of the vehicle become worse. This undesired tendency is increased when the friction coefficient becomes low in rainy weather.

SUMMARY OF THE INVENTION

It is an object of the present invention to provide a 2WD-4WD change-over control system capable of improving the control and stability of the vehicle when the coefficient of tire-to-road friction is decreased by rain and when the vehicle is accelerated or decelerated rapidly.

According to the present invention, the control system for a four wheel drive vehicle comprises rainfall sensing means for sensing a rainfall, acceleration sensing means for sensing acceleration or deceleration of the vehicle, control means, and actuating means. The control means is connected with the rainfall sensing means and the acceleration sensing means. The control means generates a 2WD command signal if an actual acceleration sensed by the acceleration sensing means is smaller than a reference acceleration which is determined in accordance with the rainfall sensed by said rainfall sensing means, or if an actual deceleration sensed by the acceleration sensing means is smaller than a reference deceleration which is determined in accordance with the rainfall. The control means generates a 4WD command signal if the actual acceleration is greater than the reference acceleration, or if the actual deceleration is greater than the reference deceleration. The actuating means is connected with the control means. The actuating means changes a drive system of the vehicle to a two wheel drive mode when the 2WD command signal is generated by the control means, and to four wheel drive mode when the 4WD command signal is generated by the control means.

DETAILED DESCRIPTION OF THE INVENTION

Figure 1:
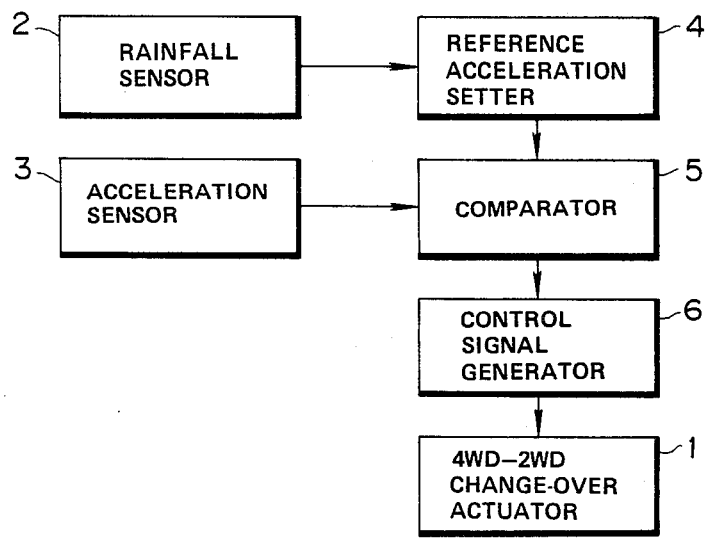
FIG. 1 is a block diagram showing a 2WD-4WD change-over control system of the present invention.

A control system of the present invention is shown in FIG. 1. The control system has a 4WD-2WD change-over actuator, or actuating means, 1 for changing a four wheel drive system from a two wheel drive mode to a four wheel drive mode and vice versa, a rainfall sensor, or sensing means, 2 for sensing an amount of precipitation such as rain that has fallen, an acceleration sensor, or sensing means, 3 for sensing an acceleration or a deceleration of the vehicle, and a control unit, or means, for controlling the actuator 1 in accordance with the output signals of the sensors 2 and 3. The control unit may have a reference acceleration setter 4, a comparator 5 and a control signal generator 6. The reference acceleration setter 4 sets a reference acceleration or a reference deceleration in accordance with the rainfall sensed by the rainfall sensor 2.

Figure 2:
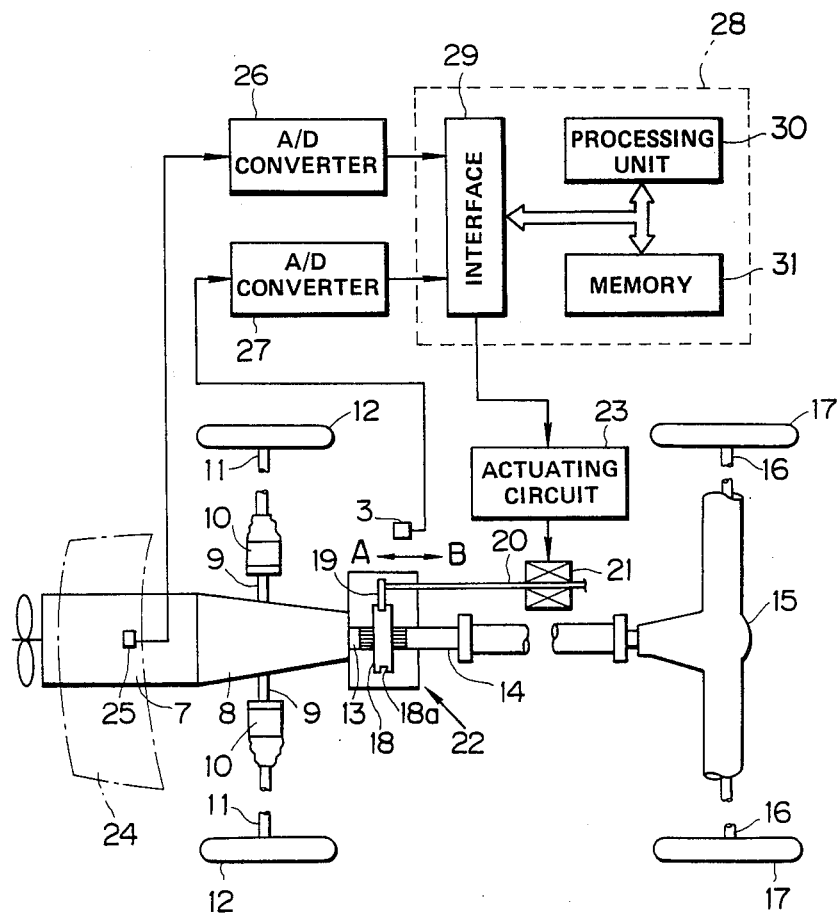
FIG. 2 is a schematic view showing one embodiment of the present invention.

One embodiment of the present invention is shown in FIG. 2.

A four wheel drive system of this embodiment is so arranged as to drive only a front wheel pair normally, and to drive both of front and rear wheel pairs in case of need. However, the present invention is also applicable to a four wheel drive system of such a type that only a rear wheel pair is driven in a two wheel drive mode.

In FIG. 2, a driving power of an engine 7 is transmitted through a transmission 8, right and left output shafts 9 on both sides of the transmission 8, right and left couplings 10, and right and left front axles 11, to right and left front wheels 12. The driving power is also transmitted to an output shaft 13 extending rearwardly from the transmission 8. The output shaft 13 has a splined rear end which is received in a 4WD-2WD change-over unit 22.

A propeller shaft 14 extends coaxially (in alignment) with the output shaft 13 from the rear end of the output shaft 13 toward the rear of the vehicle. The propeller shaft 14 has a splined front end which is received in the change-over unit 22. The splined rear end of the output shaft 13 and the splined front end of the propeller shaft 14 confronts each other with an appropriate space therebetween. A rear end of the propeller shaft 14 is connected through a differential 15 and rear axles 16, to right and left rear wheels 17.

In the change-over unit 22, an internally splined sleeve 18 is fit over the splined rear end of the output shaft 13 and the splined front end of the propeller shaft 14. The sleeve 18 has an annular groove 18a formed in an outer cylindrical surface. The annular groove 18a receives a bifurcated fork 19. The fork 19 is fixed to a rod 20, which is connected to a solenoid 21. An actuating circuit 23 sends current to energize the solenoid 21. The rod 20 is always biased in a direction shown by an arrow A in FIG. 2 by a spring (not shown).

The railfall sensor 2 comprises a raindrop sensor 25 mounted on a hood 24 of the vehicle body, an amplifier circuit and a smoothing circuit, which are connected in series. For example, the raindrop sensor 25 is of a type as disclosed in Japanese Utility Model provisional publication No. 58-64553. The raindrop sensor 25 produces a voltage signal in accordance with the magnitude of pressure and the frequency of raindrops falling on a receiving surface. The voltage signal is amplified by the amplifier circuit and smoothed by the smoothing circuit. Thus, an analog rainfall signal indicative of the rainfall is obtained.

The acceleration sensor 3 is mounted on the vehicle body at an appropriate position. The acceleration sensor 3 produces an analog acceleration signal indicative of the acceleration or deceleration of the vehicle. For example, the value of acceleration signal is positive if the vehicle velocity is increasing, and negative if the vehicle velocity is decreasing.

The acceleration sensor 3 may be in the form of an accelerometer, or may be composed of a vehicle speed sensor for producing a pulse signal indicative of a vehicle speed and a device for determining a vehicle speed from the pulse signal and determining the rate of increase or decrease of the vehicle speed. In the latter case, the vehicle speed sensor may be connected with a speedmeter cable through which the rotation of the output shaft of the transmission is taken off, or may be arranged to sense the rotational speed of a road wheel of the vehicle. One example of the device for sensing an acceleration of a vehicle is disclosed in Japanese Patent provisional publication No. 58-78813.

The rainfall sensor 2 and the acceleration sensor 3 are connected to analog-to-digital converters 26 and 27, respectively. The output digital signals of the A/D converters 26 and 27 are inputted to a microcomputer 28 for controlling the actuating circuit 23.

The microcomputer 28 comprises an interface circuit, or an interface, 29, a processing unit 30 and a memory unit 31. The A/D converters 26 and 27 and the actuating circuit 23 are connected to the interface 29.

The microcomputer 28 acts as the control unit having the functions of the reference acceleration setter 4, the acceleration comparator 5 and the control signal generator 6, as shown in FIG. 1.

Figure 3:
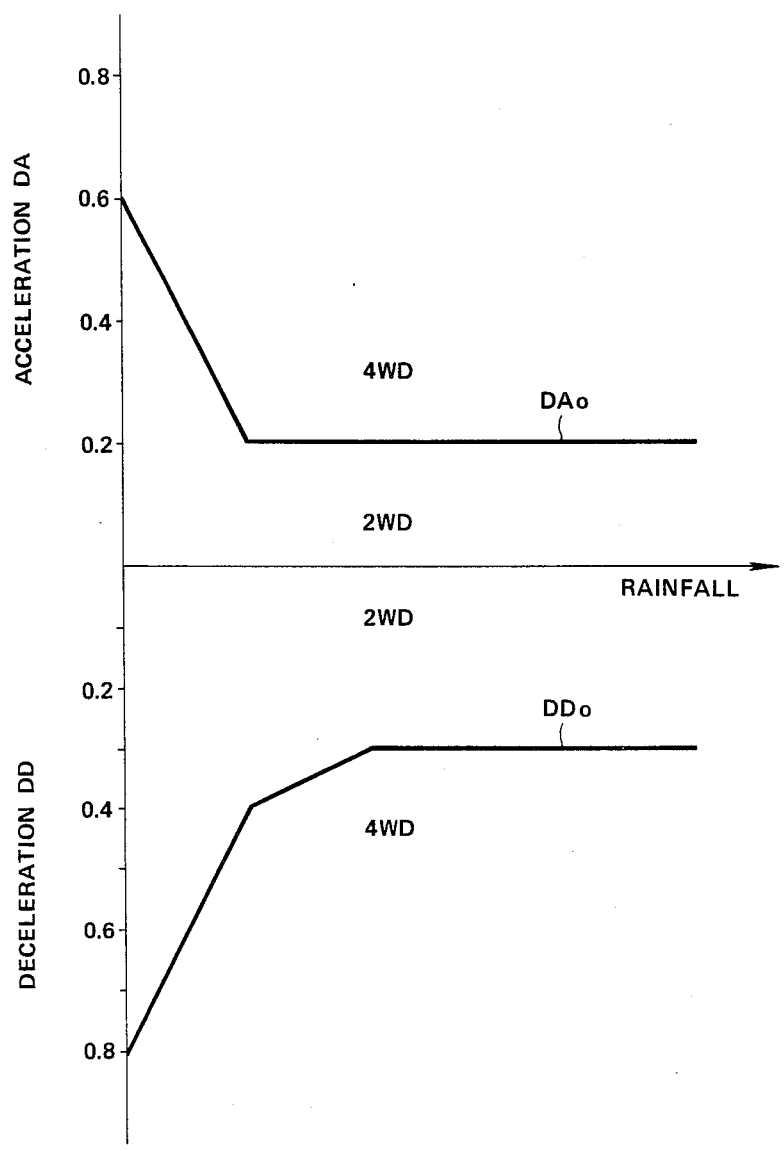
FIG. 3 is a graph showing a relationship between rainfall and reference acceleration, and a relationship between rainfall and reference deceleration.

The reference acceleration setter 4 determines a reference acceleration $DA_0$ or a reference deceleration $DD_0$ in accordance with the rainfall sensed by the rainfall sensor 2. FIG. 3 shows relationships between the rainfall and the reference acceleration or deceleration.

As shown in FIG. 3, the reference acceleration $DA_0$ decreases with increase of the rainfall until the rainfall reaches a predetermined value. In a region in which the rainfall is greater than the predetermined value, the reference acceleration $DA_0$ remains constant without regard to further increase of the rainfall. The control system of this invention puts the drive system in the four wheel drive mode if an actual acceleration DA is greater than the reference acceleration $DA_0$, and in the two drive mode if the actual acceleration DA is smaller than the reference acceleration $DA_0$.

The reference deceleration $DD_0$ decreases with increase of the rainfall until the rainfall reaches a predetermined value. In a region in which the rainfall is greater than the predetermined value, the reference deceleration $DD_0$ remains constant. The control system puts the drive system in the four wheel drive mode if an actual deceleration DD is greater than the reference deceleration $DD_0$, and in the two wheel drive mode if the actual deceleration DD is smaller than the reference deceleration $DD_0$. The microcomputer 28 may be arranged to obtain a function value of the reference acceleration $DA_0$ or the reference deceleration $DD_0$ that corresponds to a current value of the rainfall, from a table of function values stored in the memory unit 31, or may be arranged to determine $DA_0$ and $DD_0$ by performing mathematical operations.

The acceleration comparator 5 compares the actual acceleration DA (or the actual deceleration DD) sensed by the acceleration sensor 3 with the reference acceleration $DA_0$ (or the reference deceleration $DD_0$) determined by the reference acceleration setter 4, to select the two wheel drive mode or the four wheel drive mode, as shown in FIG. 3.

In dependence on the result of the comparison of the acceleration comparator 5, the control signal generator 6 outputs a logical value "0" when the two wheel drive mode is selected, and a logical value "1" when the four wheel drive mode is selected. The actuating circuit 23 decreases the exciting current applied to the solenoid 21 to zero when the output signal of the control signal generator 6 is in the "0" state, and sends the exciting current of a predetermined value to the solenoid 21 when the output signal of the control signal generator 6 is in the "1" state.

The thus-constructed control system is operated as follows:

The rainfall sensor 2 produces the analog rainfall signal in accordance with the pressure and the frequency of drops of rains impinging on the receiving surface of the raindrop sensor 25. The A/D converter 26 converts the analog rainfall signal into the digital signal, which is inputted to the interface 29 of the microcomputer 28. The acceleration signal produced by the acceleration sensor 3 is also changed from the analog form to the digital form by the A/D converter 27, and inputted into the interface 29.

Figure 4:
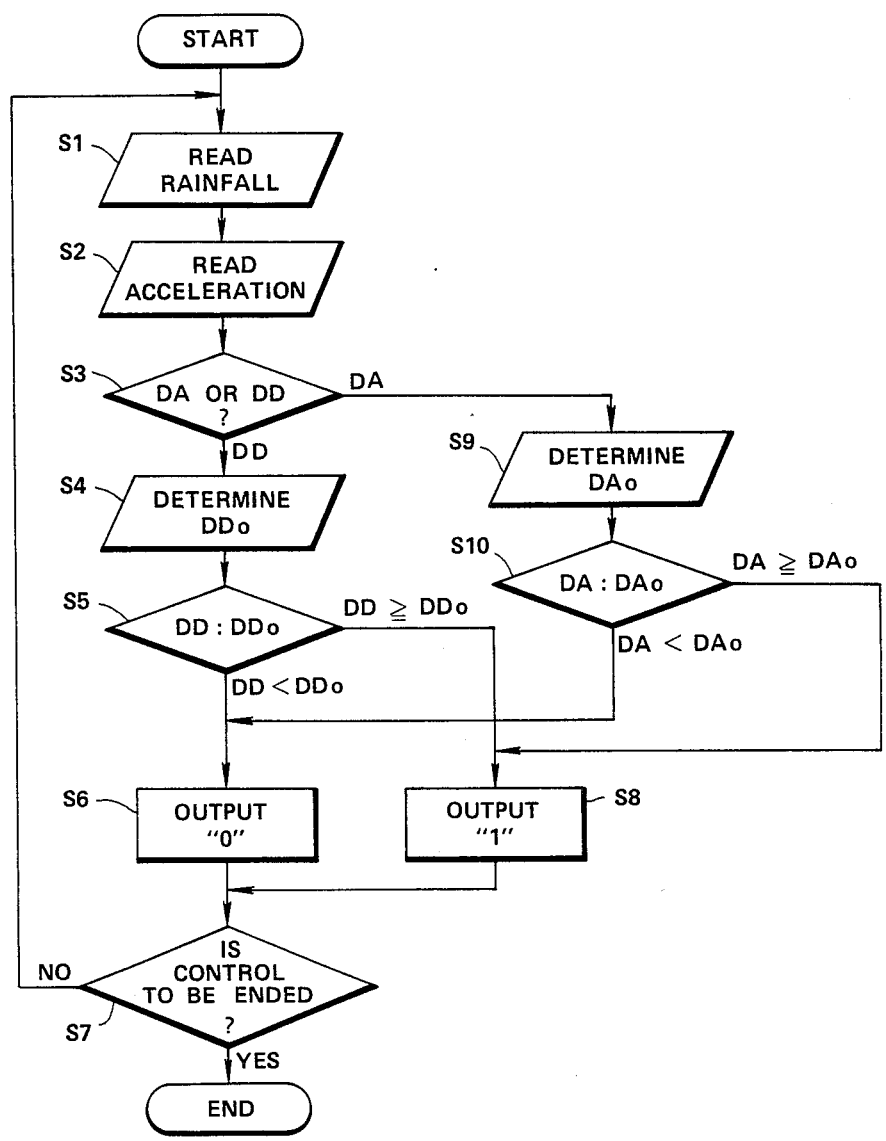
FIG. 4 is a flowchart showing a program executed by a microcomputer shown in FIG. 2.

The processing unit 30 of the microcomputer 28 performs operations as shown in the flowchart of FIG. 4.

At a step S1, the processing unit 30 reads the value of the rainfall which is sensed by the rainfall sensor 2 and digitized by the A/D converter 26. At a step S2, the processing unit reads the value of the time rate of change of the vehicle speed which is sensed by the acceleration sensor 3 and digitized by the A/D converter 27. At a step S3, the processing unit determines whether the value of the rate of change of the vehicle speed is positive or negative by checking the sign of the numerical value. If it is positive, the processing unit regards the value of the rate of change of the vehicle speed as the magnitude of the actual acceleration DA, and proceeds to a step S9. If it is negative, the processing unit regards the absolute value of the rate of change of the vehicle speed as the magnitude of the actual deceleration DD, and proceeds to a step S4.

At the step S4, the processing unit determines the reference deceleration $DD_0$ by table lock-up or calculation. At a step S5, the processing unit compares the actual deceleration DD with the reference deceleration $DD_0$.

If the actual deceleration DD is smaller than the reference deceleration $DD_0$, the processing unit outputs the logical value "0" to the actuating circuit 23, at a step S6. In response to this signal of the microcomputer 28, the actuating circuit 23 deenergizes the solenoid 21, and moves the rod 20 in the direction shown by the arrow A in FIG. 2 by the aid of the biasing spring. Therefore, the sleeve 18 is put out of engagement with the front splined end of the propeller shaft 14, and the drive system is put in the two wheel drive mode in which the driving power of the engine 7 is transmitted only to the front wheels 12. In this case, the rainfall is small and/or the actual deceleration DD is small. Therefore, each of the front and rear four wheels is capable of developing a sufficient cornering force, so that the directional controllability and stability of the vehicle are safe.

At a step S7, the processing unit determines whether to bring the control to an end or to repeat the program.

If it is determined at the step S5 that the actual deceleration DD is equal to or greater than the reference deceleration $DD_0$, then the processing unit outputs the logical value "1" to the actuating circuit 23, at a step S8. The actuating circuit 23, therefore, supplies the exciting current to the solenoid 21, which, in turn, moves the rod 20 in the direction shown by an arrow B in FIG. 2 against the force of the biasing spring. This movement of the rod 20 causes the sleeve 18 to come into engagement with both of the rear splined end of the output shaft 13 and the front splined end of the propeller shaft 14. The drive system is put in the four wheel drive mode in which the driving power of the engine 7 is transmitted to both of the front and rear wheels 12 and 17.

In this case, as shown in FIG. 3, the vehicle is in the condition in which the deceleration is great though the rainfall is small, or in the condition in which the rainfall is great though the deceleration is not so great, or in the condition in which both of the rainfall and the deceleration are great. If the vehicle remains in the two wheel drive mode under one of these conditions, each of the front and rear four wheels receives a braking force produced by the brake system, and simultaneously each of the driving two wheels (irrespectively of whether they are front wheels or rear wheels) receives, from the decelerating engine 7, a force which is in the form of engine brake and which acts in the same direction as the braking force. Therefore, the braking force applied on each of the driving wheels becomes greater, and their critical cornering forces become smaller. As a result, the driving wheels are liable to slip, and the controllability and stability of the vehicle become worse.

The control system of the present invention avoids such an undesired result by changing the drive system into the four wheel drive mode under these conditions. In the four wheel drive mode, the force of the engine 7 acting in the braking direction is transmitted to both of the front wheel pair and the rear wheel pair. Therefore, the engine brake is ensured by all of the four wheels. In the driving wheels which are driven by the engine even in the two wheel drive mode, the braking force due to engine brake is decreased and the critical cornering force is increased relatively, so that the control and stability of the vehicle are improved.

If it is decided, at the step S3, that the rate of change of the speed which is read at the step S2 is the acceleration DA, then the processing unit goes to the step S9 and determines the reference acceleration $DA_0$ in accordance with the rainfall which is read at the step S1, as shown in FIG. 3 by table look-up or by calculation. At a step S10, the processing unit compares the actual acceleration DA which is read at the step S2, with the reference acceleration $DA_0$ which is determined at the step S9.

If the actual acceleration DA is smaller than the reference acceleration $DA_0$, the processing unit proceeds to the step S6 and outputs the logical value "0" to change the change-over unit 22 to the two wheel drive mode. In this case, either or both of the actual acceleration DA and the rainfall is small, and therefore, the controllability and stability of the vehicle are safe.

If the actual acceleration DA is equal to or greater than the reference acceleration $DA_0$, the processing unit proceeds to the step S8 and brings the change-over unit 22 to the four wheel drive mode by outputting the logical value "1".

In this case, the vehicle is in the condition in which the actual acceleration DA is great though the rainfall is small, or in the condition in which the rainfall is great though the acceleration DA is not so great, or in the condition in which the rainfall and the acceleration are both great.

If the vehicle remains in the two wheel drive mode under one of these conditions, the driving force of each of the driving wheels is increased when the friction coefficient is taken into consideration. Therefore, the critical cornering force is decreased relatively, and the controllability and stability of the vehicle become worse.

The control system of the present invention changes the drive system into the four wheel drive mode under these conditions. Accordingly, the driving power of the engine 7 is transmitted to both of the front wheel pair and the rear wheel pair, so that the driving power of the vehicle is ensured by all of the four wheels. At the same time, in the driving wheels which are driven even in the two wheel drive mode, the driving force is decreased, and the critical cornering force is increased relatively, so that the controllability and stability of the vehicle are improved.

The control program of FIG. 4 is repeated until the check of the step S7 provides the affirmative answer.

In this embodiment, the 4WD-2WD change-over unit 22 is operated by the solenoid 21. However, it is possible to employ an electric motor instead of the solenoid 21.

Figure 5:
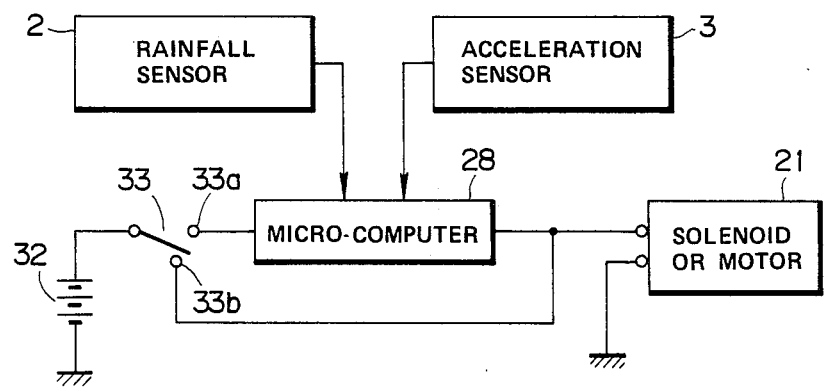
FIG. 5 is a schematic view showing a modification of the system shown in FIG. 2.

FIG. 5 shows a modification of the above-mentioned embodiment. The system of FIG. 5 has a power supply 32, and a selector switch 33 which has an automatic control position 33a, a manual 4WD position 33b, and a neutral position (manual 2WD position). This system further has the rainfall sensor 2, the acceleration sensor 3, the microcomputer 28 and the solenoid or motor 21, which are constructed and connected with one another in the same manner as in the above-mentioned embodiment.

When the selector switch 33 is put in the automatic control position 33a, the microcomputer 28 changes the drive system automatically between the two wheel drive mode and the four wheel drive mode in accordance with the rainfall and the acceleration sensed by the sensors 2 and 3 in the same manner as in the above-mentioned embodiment.

When the selector switch 33 is put in the neutral position or the manual 4WD position 33b, the microcomputer 28 is put in an off state in which the automatic control is impossible. In this case, the two wheel drive mode can be selected manually by shifting the selector switch 33 to the neutral position in which the solenoid (or motor) 21 is supplied with no power. If the selector switch 33 is shifted to the manual 4WD position 33b, the solenoid (or motor) 21 is energized to change the drive system to the four wheel drive mode with the change-over unit 22.

The control unit of the present invention may be composed of a combination of electronic circuits such as a function generator and a comparator circuit.

As mentioned above, the control system of the present invention can select the drive mode of the vehicle adequately in accordance with the rainfall and the acceleration or deceleration of the vehicle. Especially, in the case that the driving force or the braking force is large while the rainfall is so small that the coefficient of friction between road surface and tires is large enough, or in the case that the rainfall is so large that the coefficient of friction is small while the driving force or the braking force is small, the control system of the present invention changes the drive system to the four wheel drive mode. Therefore, the driving force or braking force applied on the driving wheels is decreased because a part of the driving or braking force is alloted to the other wheels. As a result, the critical cornering force of the driving wheels is increased, and the control and stability of the vehicle are improved.

In the two wheel drive mode, the wheels which are not driven by the engine are liable to lock during hard braking. The control system of the present invention can prevent such a lock of the wheels by changing the drive system to the four wheel drive mode when the brake is applied hard. In this case, the engine brake is applied on all the four wheels. Therefore, the tendency to wheel lock can be reduced, and the braking performance and stability of the vehicle can be improved.

What is claimed is:

1. A control system for a four wheel drive vehicle, comprising:
    means for sensing a rainfall,
    acceleration sensing means for sensing acceleration and deceleration of the vehicle,
    control means connected with said rainfall sensing means and said acceleration sensing means for generating a 2WD command signal if an actual acceleration sensed by said acceleration sensing means is smaller than a reference acceleration determined in accordance with said rainfall sensed by said rainfall sensing means or if an actual deceleration sensed by said acceleration sensing means is smaller than a reference deceleration determined in accordance with the rainfall sensed by said rainfall sensing means, and a 4WD command signal if said actual acceleration is greater than said reference acceleration or if said actual deceleration is greater than said reference deceleration, and
    actuating means connected with said control means for changing a drive system of the vehicle to a two wheel drive mode when said 2WD command signal is generated by said control means, and to a four wheel drive mode when said 4WD command signal is generated by said control means.

2. A control system according to claim 1 wherein each of said reference acceleration and deceleration decreases as said rainfall increases.

3. A control system according to claim 2 wherein said reference acceleration decreases from a maximum acceleration value to a minimum acceleration value with increase of said rainfall from zero to a first value, and remains equal to said minimum acceleration value constantly without regard to a further increase of said rainfall above said first value, and said reference deceleration decreases from a maximum deceleration value to a minimum deceleration value with increase of said rainfall from zero to a second value, and remains equal to said minimum deceleration value constantly without regard to a further increase of said rainfall above said second value.

4. A control system according to claim 3 further comprising manually operable selector means connected with said actuating means for allowing said actuator means to be controlled by said control means when said selector means is in an automatic control position, and preventing said actuating means from being controlled by said control means when said selector means is in a manual 4WD position or a manual 2WD position, said selector means causing said actuating means to change the drive system to the two wheel drive mode when said selector means is put in said manual 2WD position, and to change the drive system to the four wheel drive mode when said selector means is put in said 4WD position.

5. A control system according to claim 4 wherein said control means comprises means for setting said reference acceleration and said reference deceleration in accordance with said rainfall, means for comparing said actual acceleration with said reference acceleration and comparing said actual deceleration with said reference deceleration and means for generating said 2WD command signal and said 4WD command signal in accordance with the result of the comparison of said comparing means.

6. A control system according to claim 4 wherein said rainfall sensing means comprises a raindrop sensor for sensing the pressure of raindrops falling on a receiving surface of said raindrop sensor.

* * * * *